(12) United States Patent
Kannan et al.

(10) Patent No.: US 9,038,027 B2
(45) Date of Patent: May 19, 2015

(54) SYSTEMS AND METHODS FOR IDENTIFYING SOFTWARE PERFORMANCE INFLUENCERS

(75) Inventors: Ramakrishnan Kannan, Bangalore (IN); Anbazhagan Mani, Karnataka (IN); Rajan Ravindran, Karnataka (IN); Karthik Subbian, Karnataka (IN)

(73) Assignee: International Business Machines Corporation, Armonk, NY (US)

( * ) Notice: Subject to any disclaimer, the term of this patent is extended or adjusted under 35 U.S.C. 154(b) by 547 days.

(21) Appl. No.: 13/421,084

(22) Filed: Mar. 15, 2012

(65) Prior Publication Data

US 2012/0174071 A1 Jul. 5, 2012

Related U.S. Application Data

(63) Continuation of application No. 12/888,680, filed on Sep. 23, 2010.

(51) Int. Cl.
*G06F 9/44* (2006.01)
*G06F 11/36* (2006.01)
*G06F 11/34* (2006.01)

(52) U.S. Cl.
CPC ............ *G06F 8/77* (2013.01); *G06F 11/3419* (2013.01); *G06F 11/3452* (2013.01); *G06F 11/3466* (2013.01); *G06F 11/368* (2013.01); *G06F 2201/865* (2013.01)

(58) Field of Classification Search
None
See application file for complete search history.

(56) References Cited

U.S. PATENT DOCUMENTS

| 6,810,495 B2 * | 10/2004 | Castelli et al. ............... 714/47.2 |
| 2007/0061626 A1 | 3/2007 | Nelson et al. |
| 2008/0109790 A1 * | 5/2008 | Farnham et al. ............... 717/128 |

OTHER PUBLICATIONS

Final Office Action in related U.S. Appl. No. 12/888,680, mailed on Mar. 8, 2013; 15 pages.
Non-Final Office Action in related U.S. Appl. No. 12/888,680, mailed on May 5, 2014; 11 pages.
Non-Final Office Action in related U.S. Appl. No. 12/888,680, mailed on Aug. 30, 2012; 10 pages.
Notice of Allowance in related U.S. Appl. No. 12/888,680, mailed on Oct. 17, 2014; 8 pages.

* cited by examiner

*Primary Examiner* — Qamrun Nahar
(74) *Attorney, Agent, or Firm* — Schmeiser, Olsen & Watts LLP

(57) ABSTRACT

Described are a system and method for identifying variables which impact performance of software under development. Data is collected that is related to performance characteristics of the software under development. Performance change gradients are determined between previous builds of the software under development. A set of performance change factors are generated from the collected data that corresponds to each performance change gradient. Performance characteristic data corresponding to a current build of the software under development are compared to the performance change gradients. At least one fault component from the set of performance change factors that influences performance of the current build is output in response to the comparison between the performance characteristic data corresponding to the current build and the plurality of performance change gradients.

10 Claims, 8 Drawing Sheets

Execution Statistics -- Data Collection Infrastructure [PID:2440] (Filter: No Filter)    600

| >Package | TEST1 | TEST2 | TEST3 |
|---|---|---|---|
| × com.ibm._jsp | 13.473001 | 0.068045 | 19.279000 |
| × com.ibm.ws.naming.jndicos | 0.539999 | 0.012857 | 0.539999 |
| × com.ibm.ws.rsadapter.jdbc | 5.408002 | 0.023017 | 8.060002 |
| × com.sun.j2ee.blueprints.opc.pswebservice | 40.176 | 10.044000 | 40.248000 |
| · * PoEndpointBean | 40.176 | 10.044000 | 40.248000 |
| · · submitPurchaseOrder(com.sun.jbes.bhs) | 40.176 | 10.044000 | 40.248000 |
| × com.sun.j2ee.blueprints.opc.signon.web | 4.686001 | 0.037790 | 74.746999 |
| × com.sun.j2ee.blueprints.waf.controller.web | 45.796998 | 2.862312 | 58.878000 |
| × com.sun.j2ee.blueprints.waf.view.template | 1.080999 | 0.032758 | 20.359999 |
| × db2.ai.c | 0.455000 | 0.011974 | 0.455000 |
| × db2.ai.p | 0.600999 | 0.005050 | 0.600999 |
| × db2.bk.b | 0.527001 | 0.019519 | 0.778000 |
| × db2.bk.c | 2.050001 | 0.016942 | 2.651000 |
| × java.lang | 0.000000 | 0.000000 | 0.000000 |

FIG. 7

SYSTEMS AND METHODS FOR IDENTIFYING SOFTWARE PERFORMANCE INFLUENCERS

RELATED APPLICATIONS

This application is a continuation application claiming the benefit of the filing date of U.S. patent application Ser. No. 12/888,680, filed Sep. 23, 2010, entitled "Systems and Methods for Identifying Software Performance Influencers," contents of which are incorporated by reference herein in their entirety.

FIELD OF THE INVENTION

The present invention relates generally to software performance test tools and methods. In particular, the present invention is directed to systems and methods for identifying factors that affect software performance during development.

BACKGROUND

Many software applications, for example, Web applications, are designed to be highly scalable in order to simultaneously serve hundreds or thousands of users. These applications must be thoroughly tested to uncover and correct performance-related issues prior to software release.

Conventional test tools can be integrated with source code version control systems to aid developers in identifying code changes made between two successive software builds, for example, between a current build and the build immediately preceding the current build.

BRIEF SUMMARY

An embodiment of the invention features a computer-implemented method of identifying variables which impact performance of software under development. A set of data is collected that is related to performance of the software under development. Performance change gradients are determined between previous builds of the software under development. A set of performance change factors are generated from the collected data that corresponds to each performance change gradient. Performance characteristics corresponding to a current build of the software under development are compared to the performance change gradients. At least one fault component from the set of performance change factors that influences performance of the current build is output in response to the comparison between the performance characteristic data corresponding to the current build and the plurality of performance change gradients. At least one of the steps is carried out using a computer device so that variables which impact performance of software under development are identified.

BRIEF DESCRIPTION OF THE SEVERAL VIEWS OF THE DRAWINGS

The above and further advantages of this invention may be better understood by referring to the following description in conjunction with the accompanying drawings, in which like numerals indicate like structural elements and features in various figures. The drawings are not necessarily to scale, emphasis instead being placed upon illustrating the principles of the invention.

FIG. 7 is a screenshot illustrating a display of source code modules and corresponding performance data pertaining to a fault component, in accordance with aspects of the invention.

DETAILED DESCRIPTION

Figure 1:
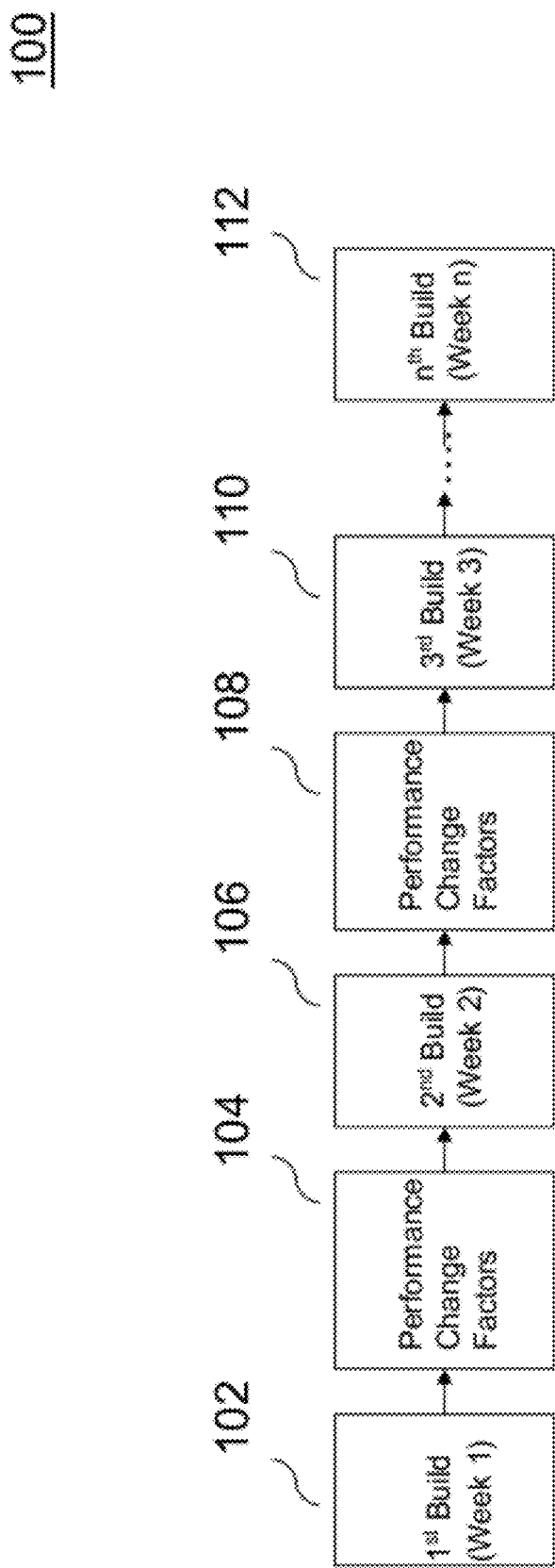
FIG. 1 is a diagram illustrating a series of software builds and one or more performance change factors between the builds, in accordance with aspects of the invention.

In the following description, specific details are set forth although it should be appreciated by one of ordinary skill that the present invention can be practiced without at least some of the details. In some instances, known features or processes are not described in detail so as not to obscure the present invention.

The present invention features a system and method that can identify one or more fault components affecting the performance of a software application during development. The system and method perform piece-wise linear regression on past performance data to identify versions of source code, hardware, operating systems, or other performance change factors related to the current software build. The system and method also permit an identified fault component, for example, a source code module, to be selected, wherein a history of all changes, for example, source code changes, responsible for the change in performance to be output to a display.

Although some embodiments herein refer to methods, it will be appreciated by one skilled in the art that they may also be embodied as a system or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "processor," "device," or "system." Furthermore, aspects of the present invention may take the form of a computer program product embodied in one or more computer readable mediums having computer readable program code embodied thereon.

Any combination of one or more computer readable mediums may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowcharts and block diagrams in the figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

FIG. 1 is a diagram illustrating a series of software builds 102, 106, 110, 112 and one or more performance change factors 104, 108 between the builds, in accordance with principles of the invention. While the software builds 102, 106, 110, 112 are shown in FIG. 1 as being generated on a weekly basis, the software builds can be generated at other predetermined times.

Performance change factors 104, 108 can occur between consecutive builds, and can influence software performance of subsequent builds. The performance change factors 104, 108 can include, but not be limited to, changes in source code versions, for example, software module versions. The performance change factors 104, 108 can also include changes in an operating environment under which the build is performed, for example, changes in hardware type or operating system version under which the software under development is produced.

Figure 2:
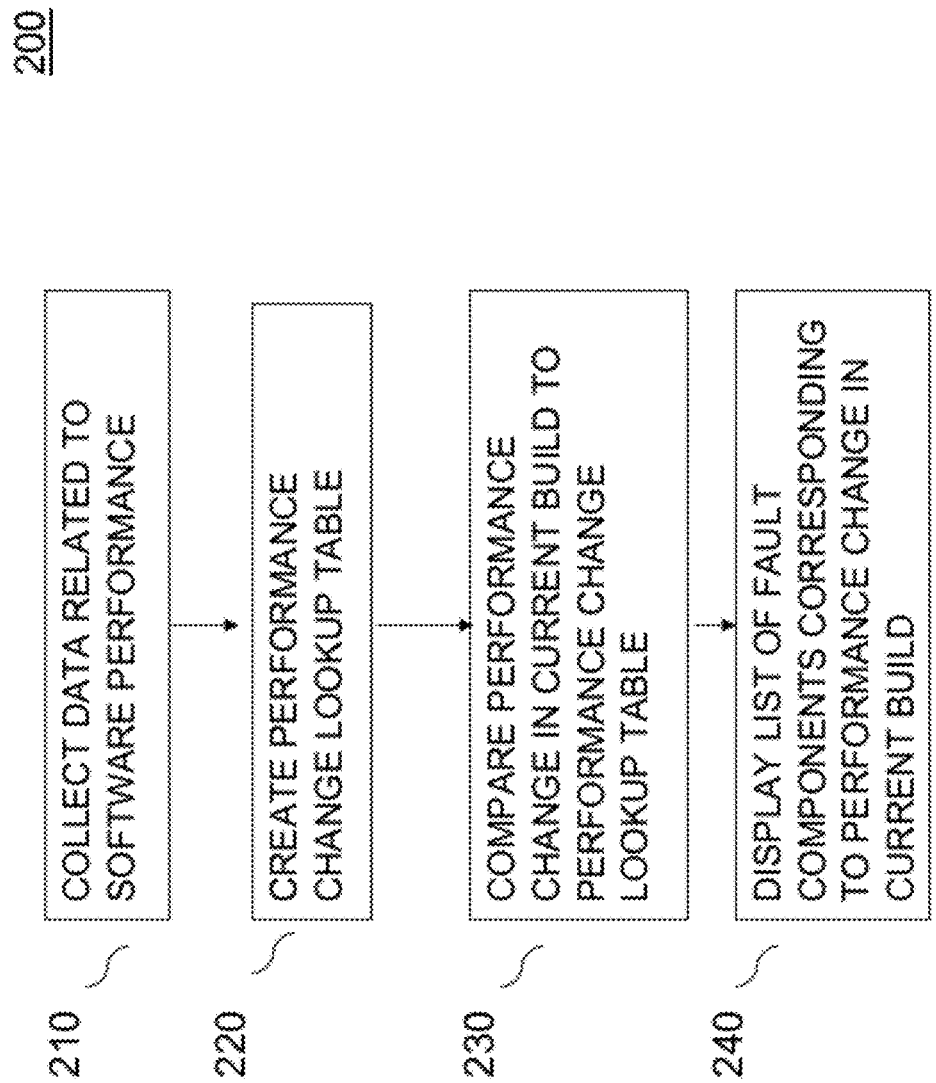
FIG. 2 is a flow diagram of an embodiment of a process for identifying fault components, in accordance with aspects of the invention.

FIG. 2 is a flow diagram of an embodiment of a process 200 for identifying fault components, in accordance with aspects of the invention. For example, referring to FIG. 1, the process 200 can identify fault components of the performance change factors that positively or negatively influence the performance of a software build (n+1) (not shown) of a current week based on historical data, such as data pertaining to previous software builds 102, 106, 110, 112, and previous performance change factors 104 and 108.

In step 210, data related to software performance is collected. Such data can include performance data pertaining to previous builds, for example, response times. Other data can include performance change factors between builds. For example, as shown in FIG. 1, performance change factors 104 can be collected when performance tests are performed on the second build 106. Performance change factors 104 can include, for example, hardware and/or software changes made between the first and second builds 102, 106. Other collected performance data can include performance statistics or environmental data, such as hardware configuration information, software component version information, dependent binary change information, operating system version information, version details on environment variables and product modules, and the like.

Table 1 illustrates a set of collected data related to software performance.

TABLE 1

| Build | Performance Change Factor | Performance (ms) | Performance Change from Previous Build (ms) |
|---|---|---|---|
| 1st Build | N/A | 1000 | N/A |
| 2nd Build | a3, a4, a5 | 1250 | −250 |
| 3rd Build | a4, a6, a7 | 1450 | −200 |
| 4th Build | a4, a6, a7 | 1200 | +250 |
| 5th Build | a3, a5, a6 | 900 | +300 |
| 6th Build | a3, a5, a7 | 1300 | −400 |
| 7th Build | a1, a2, a3 | 1700 | −300 |
| 8th Build | a2, a5, a6, a7 | 2050 | −350 |
| 9th Build | a1, a4, a5 | 1650 | +400 |
| 10th Build | a5, a6, a7 | 1350 | +300 |

Table 1 includes a set of data related to a software application under development. In Table 1, the data includes a set of performance change factors, for example, software modules a1 through a7, which can include, but are not limited to, changes in the software module versions, environment settings such as hardware configurations or operating systems, versions, or data related to other changes made between two software builds.

For example, a performance test tool can determine that the first build 102 shown in FIG. 1 has a performance response time of 1000 ms. A subsequent second build 106 is determined to have a performance response time of 1250 ms. In this example, the performance test tool determined that changes were made in software modules a3, a4, a5 between the first build 102 and the second build 106.

The data shown in Table 1 can be stored in a data repository such as a database, referred to as a performance database. The data can include performance information pertaining to each build (Table 1, column 3), changes in performance measurements between builds (Table 1, column 4), and a list of performance change factors collected between builds (Table 1, column 2). Other data not shown in Table 1 can also be stored, such as collected component version details and/or environment variable details such as those described herein.

In step 220, a performance change lookup table is created that includes the data collected in step 210, for example, the contents of Table 1. An example of a performance change lookup table is illustrated at Table 2.

TABLE 2

| Start Build | End Build | Performance Change Factors Between Start Build and End Build | Linear Regression Output | Gradient Performance Change |
|---|---|---|---|---|
| 2nd Build | 3rd Build | a3, a4, a5, a6, a7 | y = 50x − 250 | +50 |
| 4th Build | 5th Build | a3, a4, a5, a6, a7 | y = 50x + 250 | +50 |
| 6th Build | 8th Build | a1, a2, a3, a5, a6, a7 | y = 25x − 375 | +25 |
| 9th Build | 10th Build | a1, a4, a5, a6, a7 | y = −100x + 400 | −100 |

The performance change lookup table can be organized into a plurality of row entries, wherein each row entry includes a trend in performance between two builds based on the data collected in step 210. For example, a row entry is created in the performance change lookup table, which includes a set of performance change factors a3, a4, a5, a6, a7 corresponding to consecutive negative performance data from the second build 106 and third build 110 shown in Table 1, e.g., −250 ms and −200 ms, respectively.

The gradient performance change values are determined by performing linear regression on the collected performance data, specifically, the collected continuous positive performance data and continuous negative performance data. In an embodiment, piece-wise linear regression is performed on the collected performance data. In particular, each performance change gradient is determined by linear regression performed on collected negative performance trend data or positive performance trend data between a start build and an end build of the software under development. For example, linear regression is performed on the performance data between each start and end build shown in Table 2. Although linear regression is illustrated herein, other mathematical techniques can be applied to the performance data to determine causes for fluctuations in performance between software versions.

The gradient performance change value corresponds to a set of performance change factors between the given start build and a given end build. Thus, if a current build is determined to have degradation in performance of 25 ms, a comparison can be made in the performance change lookup table, which indicates that the sixth through eighth builds have a gradient performance change of +25. Thus, a list of software modules (a1, a2, a3, a5, a6, a7) are identified as being fault components possibly contributing to the change in performance by the current build.

The following convention can be used in creating a performance change lookup table.

$A=\{a_1, \ldots, a_n\}$ refers to a list of performance change factors, for example, modules, components, etc., between build periods 1 and n (see FIG. 1).

$I_i$ refers to a begin entry in a performance database, for example, a Build entry shown in Table 1.

$m \in N$ refers to the total number of entries in the performance database.

$\lambda \in \Re$ refers to a performance change from a previous build to a current build, for example, Table 1, column 4.

$\delta \in \Re$ refers to a tolerance level, which can be user-defined.

$\Delta \in \Re$ refers to a performance change gradient between the entries $I_i$ to $I_j$ wherein $j \neq i$ determined by linear regression.

$f$ refers to a linear regression function where $f(I_i, \ldots, I_j) = \Delta x + c$ $P_i$ refers to an entry in a performance change lookup table, for example, Table 2.

Figure 3:
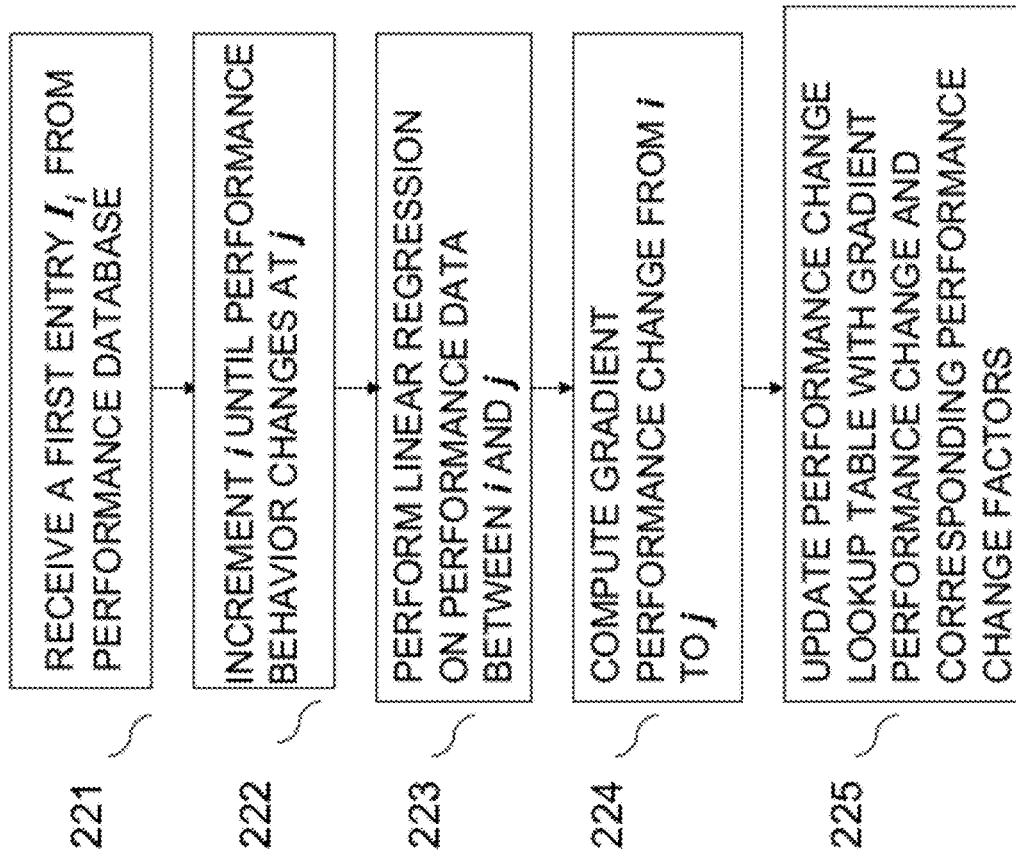
FIG. 3 is a flow diagram of an embodiment of a process for creating a performance change update table, in accordance with the aspects of the invention.

FIG. 3 is a flow diagram of an embodiment of a process 220 for creating a performance change lookup table, in accordance with aspects of the invention.

In step 221, for each row in the performance change lookup table, a first entry $I_i$, also referred to as a begin entry or start build entry, is provided from a performance database. For example, the 2nd Build shown in Table 1 is entered in the performance change lookup table. Additional data can also be provided from the performance database to the performance change lookup table, for example, performance change factors a3, a4, a5 and/or performance measurement 1250 ms corresponding to the 2nd Build shown in Table 1.

In step 222, $I_i$ is incremented until the performance behavior of consecutive software builds changes from positive to negative or from negative to positive. The build at which the performance behavior changes is also referred to as an end entry, also referred to as an end build entry. In step 222, $I_j$ is the end entry. For example, 3rd Build entry shown in Table 1 is entered in the performance change lookup table, as well as performance data and/or performance change factors corresponding to the 3rd Build.

In step 223, linear regression is performed on the data collected in step 210 according to the function $f(I_i, \ldots, I_j) = \Delta x + c$. In one embodiment, the linear regression is piece-wise linear regression performed on continuous positive performances between i and j. In another embodiment, the linear regression is a piece-wise linear regression performed on continuous negative performances between i and j. In the above example, linear regression is performed on the performance data corresponding to the $2^{nd}$ Build and the $3^{rd}$ Build.

In step 224, the linear regression determines a gradient performance change ($\Delta$) from $f(I_i, \ldots, I_j) = \Delta x + c$ between i and j; in the example above, gradient performance change value +50 shown in Table 2. The linear regression also determines a constant (c) with regard to the function $f(I_i, \ldots, I_j) = \Delta x + c$.

Subsequently, a change in performance in a current build, for example, an $11^{th}$ Build generated after the $10^{th}$ Build illustrated in Table 1, can be looked up in the performance change lookup table so that a list of fault components are determined from the performance change lookup table that may be responsible for the change in performance of the current build. The fault components are referred to herein as far $\{a_k, \ldots, a_l\} \subset A$.

In step 225, the performance change lookup table is updated with the results of step 224, for example, shown by $\{a_k, \ldots, a_l\} \subset A$ as well as the performance change gradient $\Delta$ between entries $I_i$ and $I_j$. Thus, when linear regression is performed on the performance change data of the current build, and the performance change lookup table can be updated to include a performance change gradient and a set of corresponding fault components between a previous build and the current build.

Returning to FIG. 2, in step 230, when a current build of the software under development is produced, performance data can be determined for the current build. This performance data are stored in the data repository described above with regard to other contents of Table 1. Changes in performance of the current build are compared to the data in the performance change update table, for example, the gradient performance change values determined by linear regression.

In step 240, a list of fault components are displayed that may be responsible for the change in performance of the current build compared to previous builds. A performance range $\Delta+/-\delta$ is provided for an entry in the performance change lookup table, wherein a list of fault components corresponding to the entry in the range of $\Delta+/-\delta$ is output, indicating that these fault components are performance influencers that possibly caused the change in performance in the current build. Accordingly, the fault components corresponding to the current build can be determined by the historical data in the performance change lookup table.

For example, referring to FIG. 1 and Tables 1 and 2, for an $(n+1)^{th}$ build (not shown) in an $11^{th}$ week, also referred to an $11^{th}$ build, a performance test tool determines that the performance response time of the $11^{th}$ build is 1325 ms. Since the performance response time of the previous build, i.e., the $10^{th}$ build, is determined to be 1350 ms, performance between the $10^{th}$ and $11^{th}$ builds increases by +25 ms. A user-defined tolerance level of $\delta = 10$ ms is provided. Thus, the range $\Delta+/-\delta$ corresponding to the change in performance of +25 ms is between +15 ms and +35 ms. A comparison is made between this range in performance changes and a list of gradient performance change factors shown in Table 2. Accordingly, the gradient performance change +25 corresponding to the period between the $6^{th}$ Build and $8^{th}$ Build is in the range of +15 ms to +35 ms. The list of fault components corresponding to gradient performance change +25 in the performance change lookup table includes software modules a1, a2, a3, a5, a6, a7, which are determined to cause the change in performance of the current build. In cases where two table entries are the same, for example, gradient performance change +50 shown in rows 2 and 3 of Table 2, the performance change factors associated with the gradient performance change in each row are identified as fault components.

Figure 4:
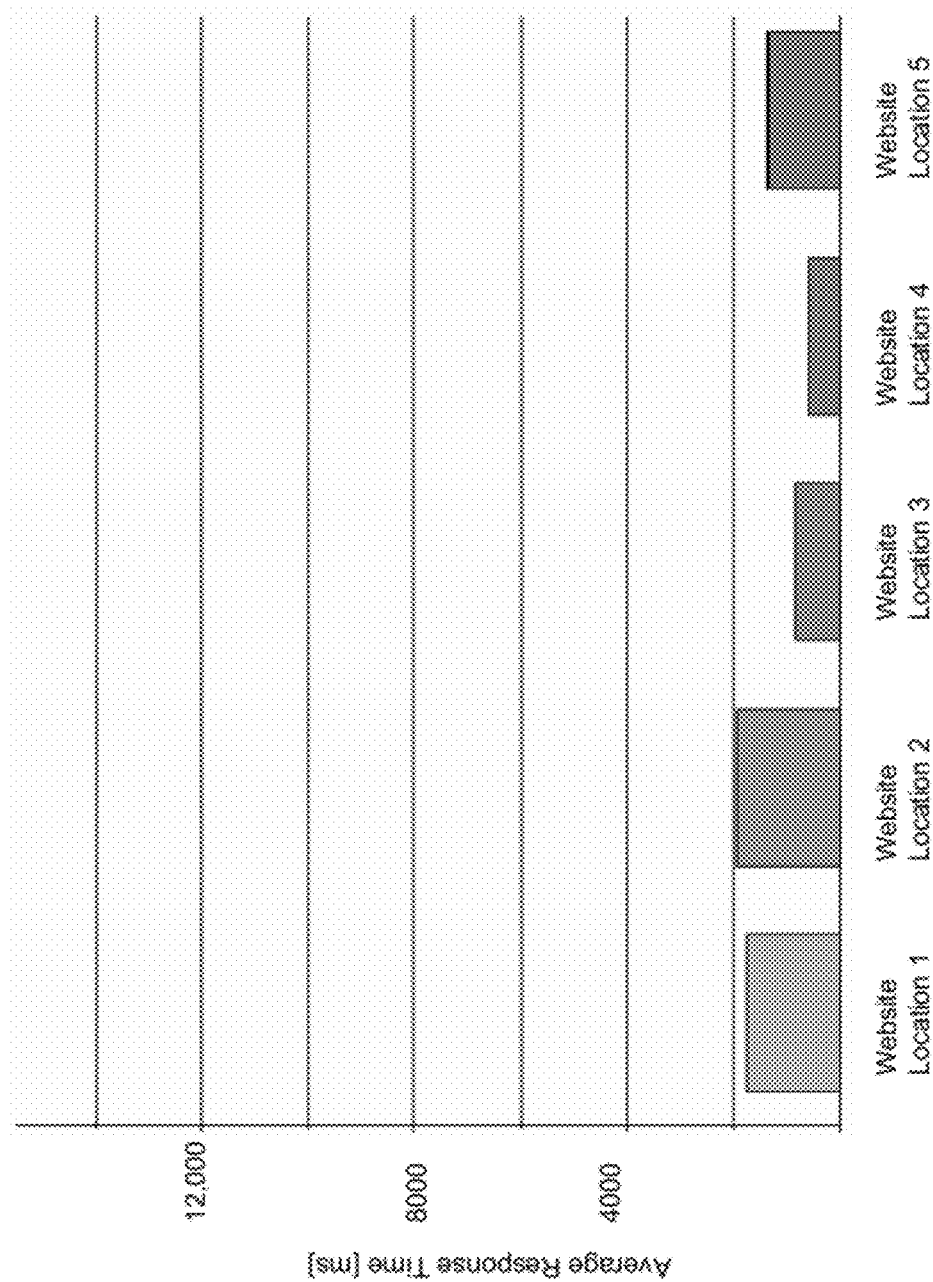
FIG. 4 is a display graph generated by a performance testing tool that illustrates performance data pertaining to a software application.

FIG. 4 is a display graph 300 generated by a performance testing tool that illustrates performance data pertaining to a Web application. The Web application is measured for performance. In particular, the response times of five Website locations are measured. For example, Website Location 4 is determined to have a faster response time than other locations, for example, Website Location 2. Accordingly, it is desirable to the software developers to determine the cause of the slower response time of Website Location 2, or to determine the cause of the faster response time of Website Location 4.

Figure 5:
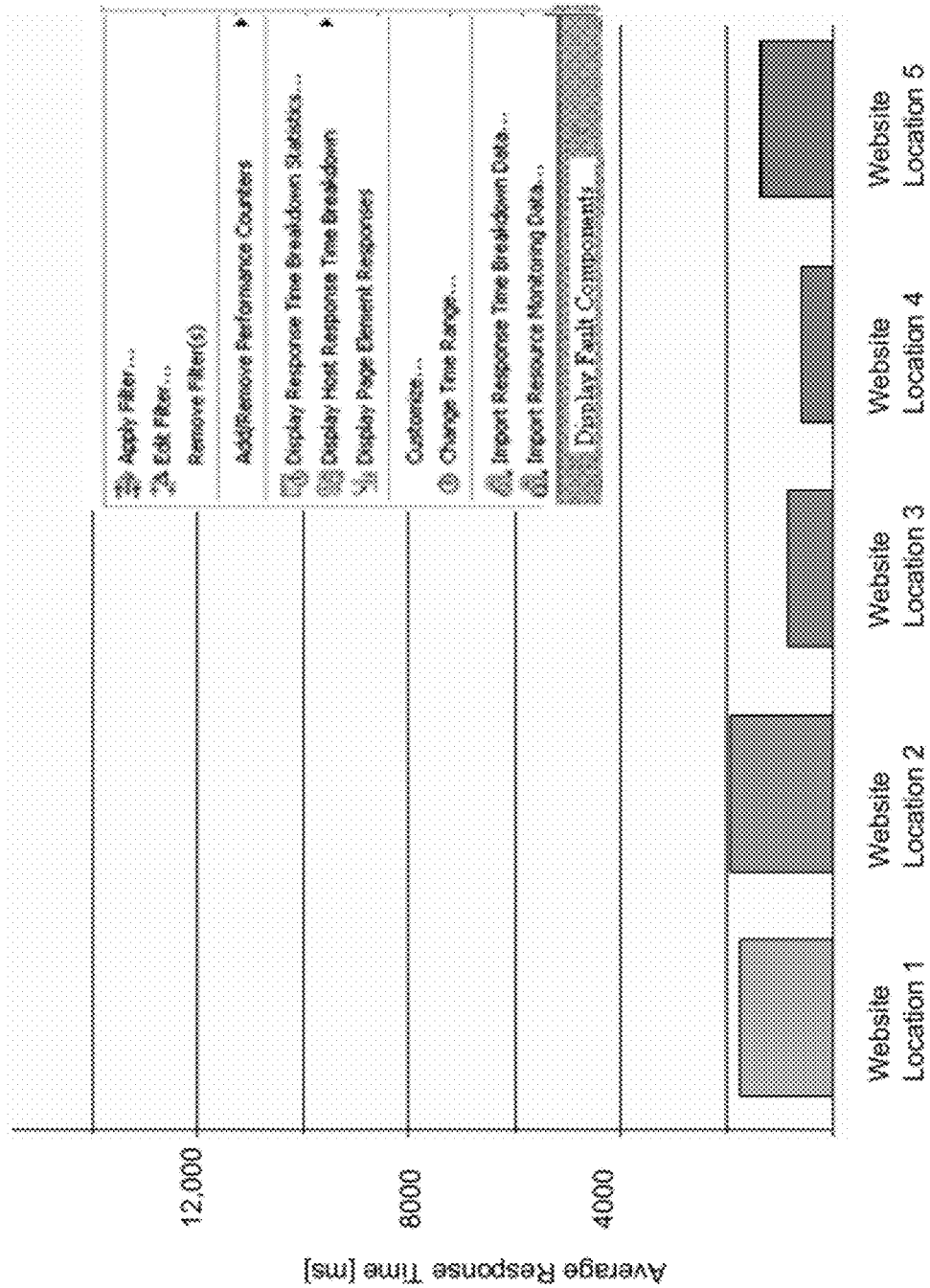
FIG. 5 is a screenshot of a dropdown menu, wherein a menu item is executed in the display graph of FIG. 4 which, when selected, displays a list of fault components in response to a performance change table lookup, in accordance with aspects of the invention.
Figure 6:
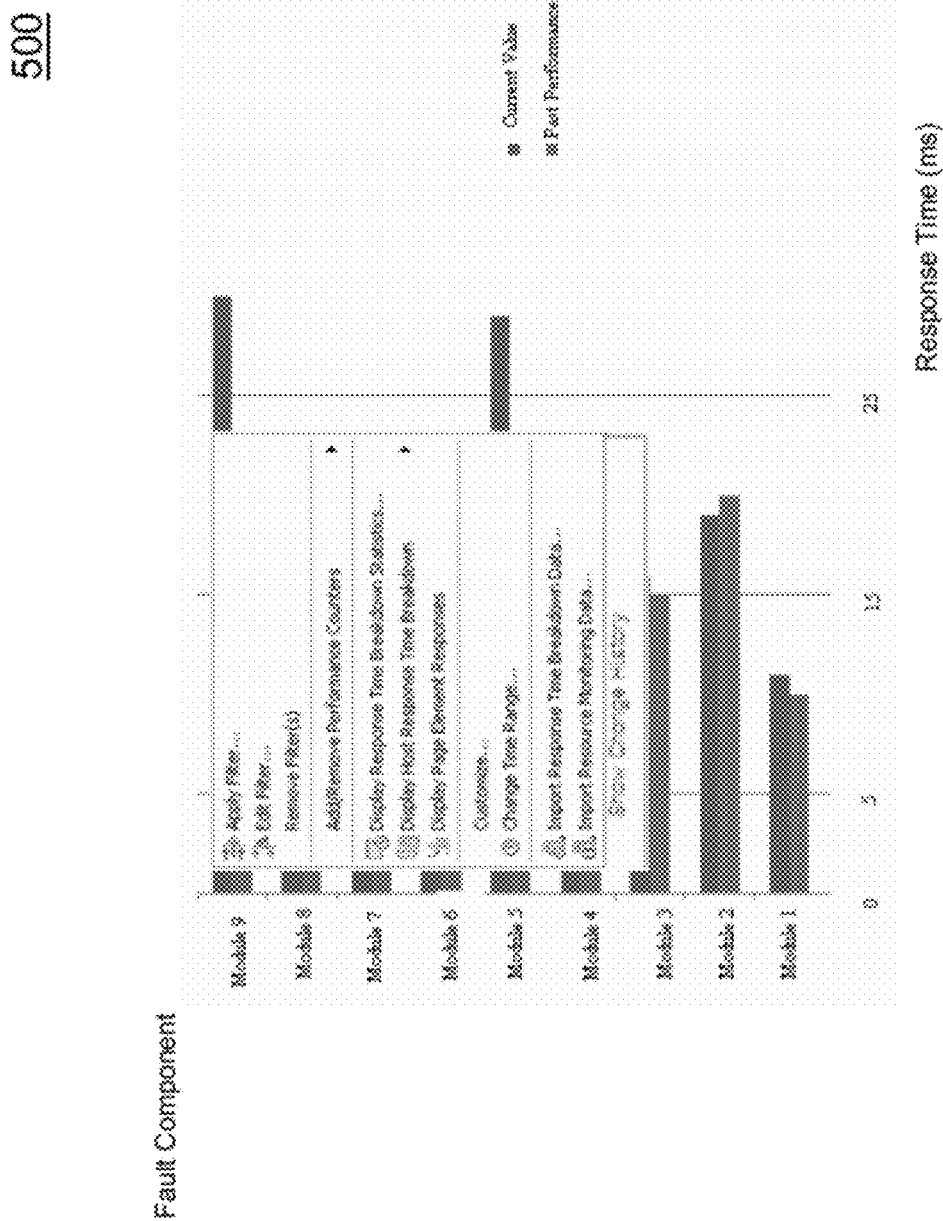
FIG. 6 is a screenshot illustrating a list of fault components and corresponding performance data in response to the selection of the menu item shown in FIG. 5, in accordance with aspects of the invention.

FIG. 5 is a screenshot 400 of a dropdown menu, which includes a menu item "Display Fault Components." When the menu item "Display Fault Components" is selected, a program is executed that performs linear regression in accordance with the embodiments herein, wherein the fault components contributing to the performance change between the current build and previous builds are displayed along with the impacted performance data, for example, either negative performance data or positive performance data. As shown in FIG. 6, performance data such as response times is displayed for each software module 1-9. As shown in FIG. 6, a current value can be displayed, which includes the current response time of each displayed fault component, for example, module 1 through module 9. In addition, past performance data can be displayed. For example, as shown in FIG. 6, a current response time of module 1 is 10 ms, which is an improvement in performance as compared to previous versions of module 1, i.e., 11 ms.

FIG. 7 is a screenshot illustrating a display of source code changes pertaining to a selected module shown in FIG. 6 responsible for a change in performance, in accordance with aspects of the invention. For example, when selecting a module from the list of fault components displayed in FIG. 6, a user can select a menu option "Show Change History," wherein all code changes responsible for the change in performance caused by the selected module are displayed. Details can include file name, and performance data pertaining to previous tests performed on the source code corresponding to the file name. This feature permits a software developer to determine which source code changes occurred in a current build that resulted in a performance change of the current build.

Figure 8:
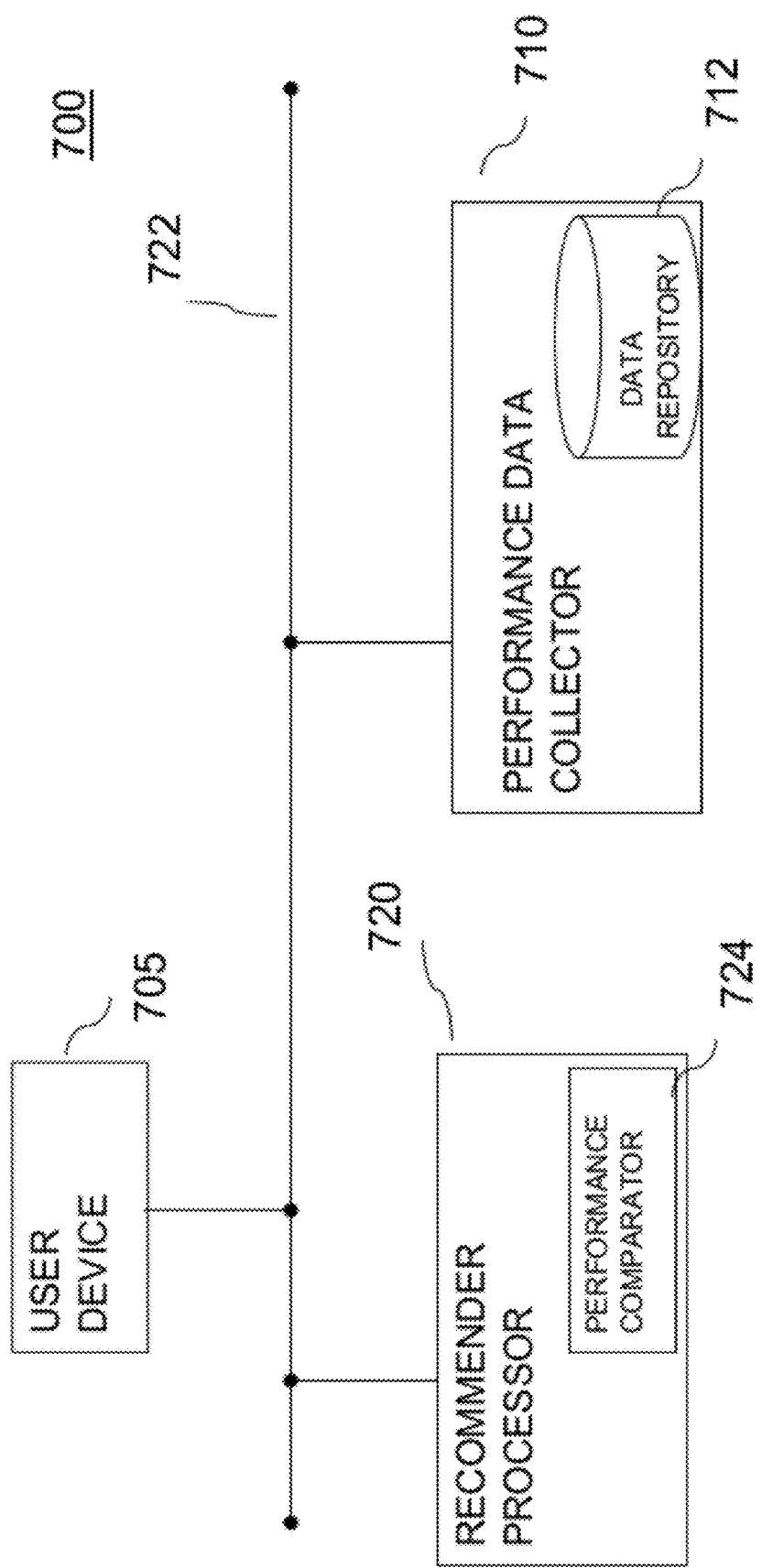
FIG. 8 is a block diagram of a recommender system, in accordance with aspects of the invention.

FIG. 8 is a block diagram of a recommender system 700, in accordance with the aspects of the invention. The recommender system 700 includes a user interface device 705, a data repository 710, and a recommender processor 720. Two or more of the user interface device 705, data repository 710, and recommender processor 720 can be collocated under a single hardware platform, including but not limited to a desktop computer, laptop computer, server system, handheld device such as a personal digital assistant (PDA), a cellular phone, or network terminal. Alternatively, the user interface device 705, data repository 710, and recommender processor 720 can be separate physical devices in communication with each other via a direct connection 722, or through any type of network, for example, network types described herein.

The user interface device 705 includes components known to those of ordinary skill in the art for inputting data to the recommender processor 720 and/or data repository 710, and for receiving information from the recommender processor 720 and/or data repository 710, for example, monitor or display, one or more user input devices, e.g., a keyboard, mouse, trackball and the like, non-removable or removable non-volatile storage media, for example, hard disks, CD ROMs, thumb drives, and the like, and/or other peripheral devices, for example, printers.

The user interface device 705 can include one or more software applications that execute entirely on the user interface device 705, or partly on the user interface device 705 as a standalone software package, partly on the user interface device 705 and partly on a remote computing device in communication with the user interface device 705, for example, a file server. Software applications can include applications that permit the user interface device 705 to communicate with the data repository 710 and/or the recommender processor 720.

During operation, a user can input data from the user interface device 705 to the data repository 710, for example, data in Table 1 referred to herein. A user can request a list of fault components for a software build, for example, described herein. This can be achieved by the user clicking a menu item such as "Display Fault Components," as described above with regard to FIG. 5, which can be displayed on the user interface device 705. A user can also request a list of display of code changes pertaining to a particular fault component, for example, a software module as described herein with regard to FIGS. 6 and 7.

The data repository 710 stores data related to performance of software under development. This includes performance data for each build, for example, shown in Table 1. The data repository 710 can also store data pertaining to a performance change lookup table, for example, shown in Table 2.

The recommender processor 720 performs a linear regression on the performance data to produce gradient performance change data as described above. The recommender processor includes a performance comparator 724 that compares performance data of a current build to performance change data in the performance change lookup table stored in the data repository 712, and in response generates a set of fault components that may be responsible for the change in performance.

The recommender system 700 can be integrated with a source code version control system, which can identify all hardware and/or software changes made between two software builds, referred to as a first set of changes, and can further identify those hardware and/or software changes that influence the change in performance between the software builds, referred to as a second set of changes. While it is preferred that the second set of changes is a subset of the first set of changes, external events can erroneously identify changes, referred to as false positives. A feature of the present invention is to compare the first and second set of changes to each other, and thereby reduce false positives, e.g., erroneously identified fault components. To achieve this, the system and method described herein optionally include a user control lever (not shown) that reduces the list of fault components to a more accurate list by outputting a user-defined tolerance level δ described above, permitting the recommender processor 720 to determine a range of performance changes which can be compared to a performance change in the current build.

The system and method of the present invention can be integrated with source code version control software to identify source code changes that are relevant to changes in performance. The system and method can also be integrated as part of a performance test tool package, for example, Rational Performance Tester by International Business Machines Corp. of Armonk, N.Y., or software configuration management tools, for example, Rational SCM, and/or version control systems readily known to those of skill in the art.

While the invention has been shown and described with reference to specific embodiments, it should be understood by those skilled in the art that various changes in form and detail may be made therein without departing from the spirit and scope of the invention.

What is claimed is:

1. A computer-implemented method of identifying variables which impact performance of software under development, comprising:

collecting data related to performance characteristics of the software under development;

performing a piece-wise linear regression operation on the collected set of data;

determining a historical performance change gradient between previous two or more builds of the software under development;

identifying source code changes and environment changes related to the performance characteristics of the software under development;

determining a performance change factor from the collected data that corresponds to each historical performance change gradient;

comparing performance characteristic data corresponding to a performance change gradient between a current build of the software under development and a previous build of the software under development to the historical performance change gradients; and outputting at least one fault component from the set of performance change factors that influences performance of the current build in response to the comparison, wherein at least one of the steps is carried out using a computer device so that variables which impact performance of software under development are identified.

2. The method of claim 1, wherein determining the performance change gradients comprises:

receiving a first entry corresponding to a first build of the software under development from the collected set of data, the first entry including one of positive performance change data and negative performance change data corresponding to the first build of the software under development;

receiving subsequent entries from the collected set of data, each subsequent entry including the one of positive performance change data and negative performance change data corresponding to the subsequent entry, until a second entry corresponding to a second build of the software under development is received that includes the other of the positive performance change data and the negative performance change data; and performing linear regression on the one of the positive performance change data and the negative performance change data corresponding to the first entry and the subsequent entries to produce a performance a performance change gradient between the first and second entries.

3. The method of claim 2 further comprising creating a performance change lookup table from the collected set of data, the performance change lookup table including the first entry, the subsequent entries, the second entry, the historical performance change gradients determined by linear regression, and the fault components corresponding to each historical performance change gradient.

4. The method of claim 1, wherein the performance change lookup table is stored in a data repository.

5. The method of claim 1, wherein the collected set of data includes at least one of software changes between the previous builds of the software under development, performance data pertaining to the previous builds, source code version information, and operating environment data.

6. The method of claim 5, wherein the operating environment data includes at least one of hardware configuration information, software component version information, dependent binary change information, and operating system version information.

7. The method of claim 1, wherein the collected set of data is provided by a version control system, the version control system including source code version control software.

8. The method of claim 1, wherein comparing the performance characteristic data to the historical performance change gradients comprises:
   determining a current build performance range by applying a tolerance range to the performance characteristic data corresponding to the current build; and
   comparing the current build performance range to the historical performance change gradients.

9. The method of claim 1, wherein the performance characteristic data of the current build includes data related to a performance improvement or a performance lag of the current build.

10. The method of claim 1 further comprising displaying a history of changes made to the at least one fault component.

\* \* \* \* \*